Feb. 10, 1970   F. SANTAGATA ET AL   3,494,330
ANIMAL CAGE
Filed Jan. 15, 1968   4 Sheets-Sheet 1
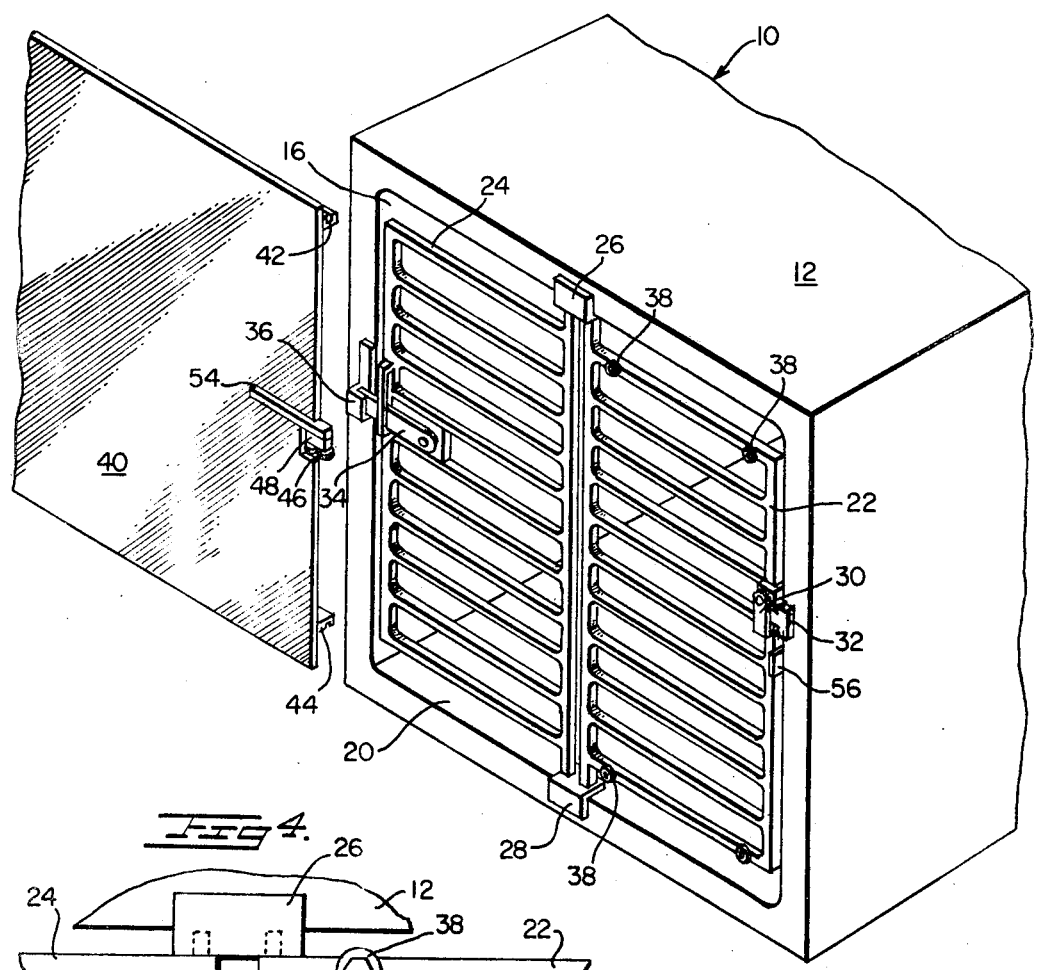
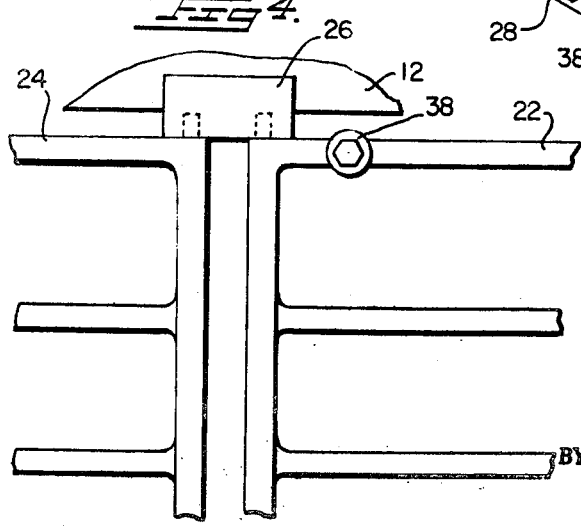
INVENTOR
FRANK SANTAGATA
GEORGE L. BRAVERMAN
BY *Stowell & Stowell*
ATTORNEYS

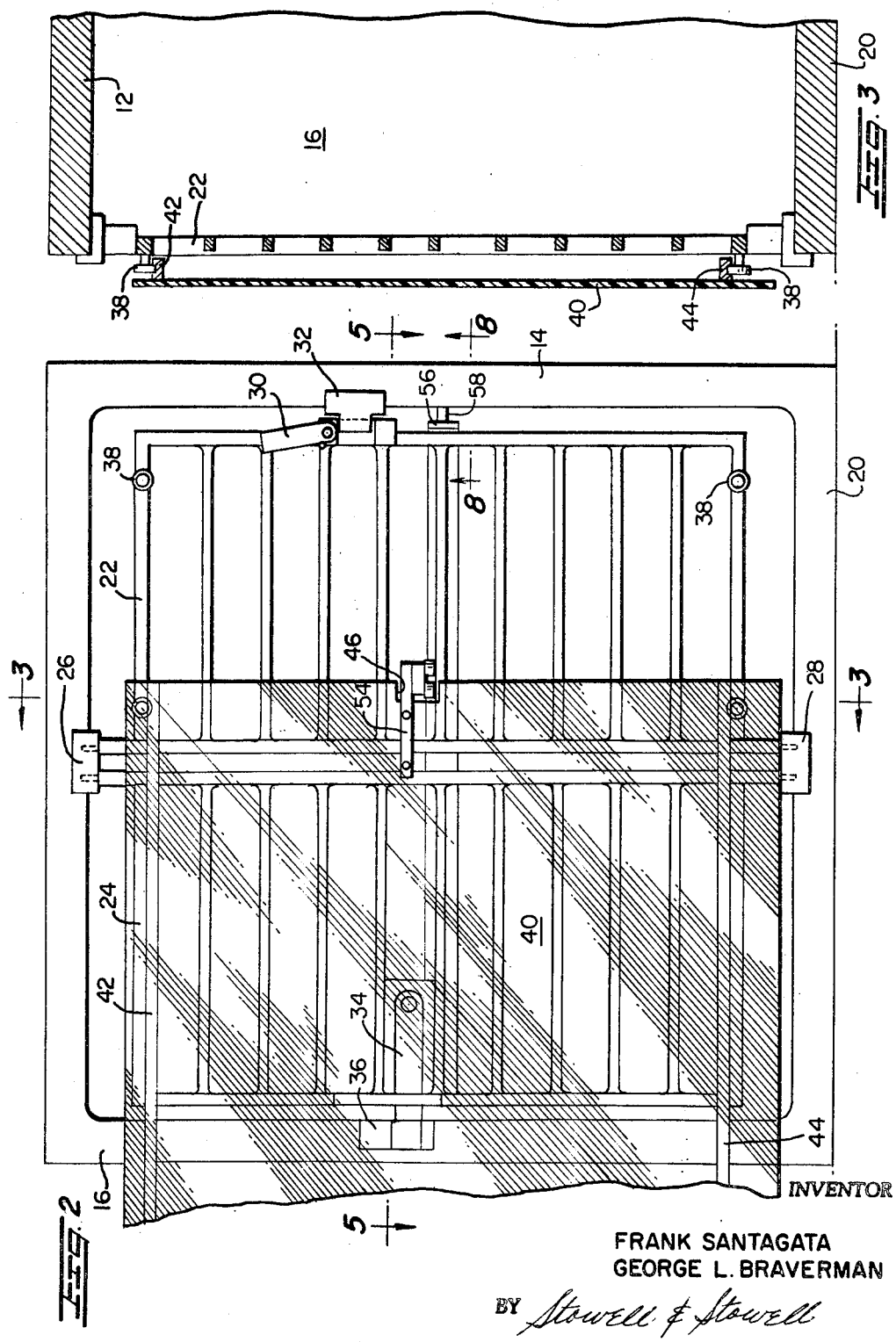

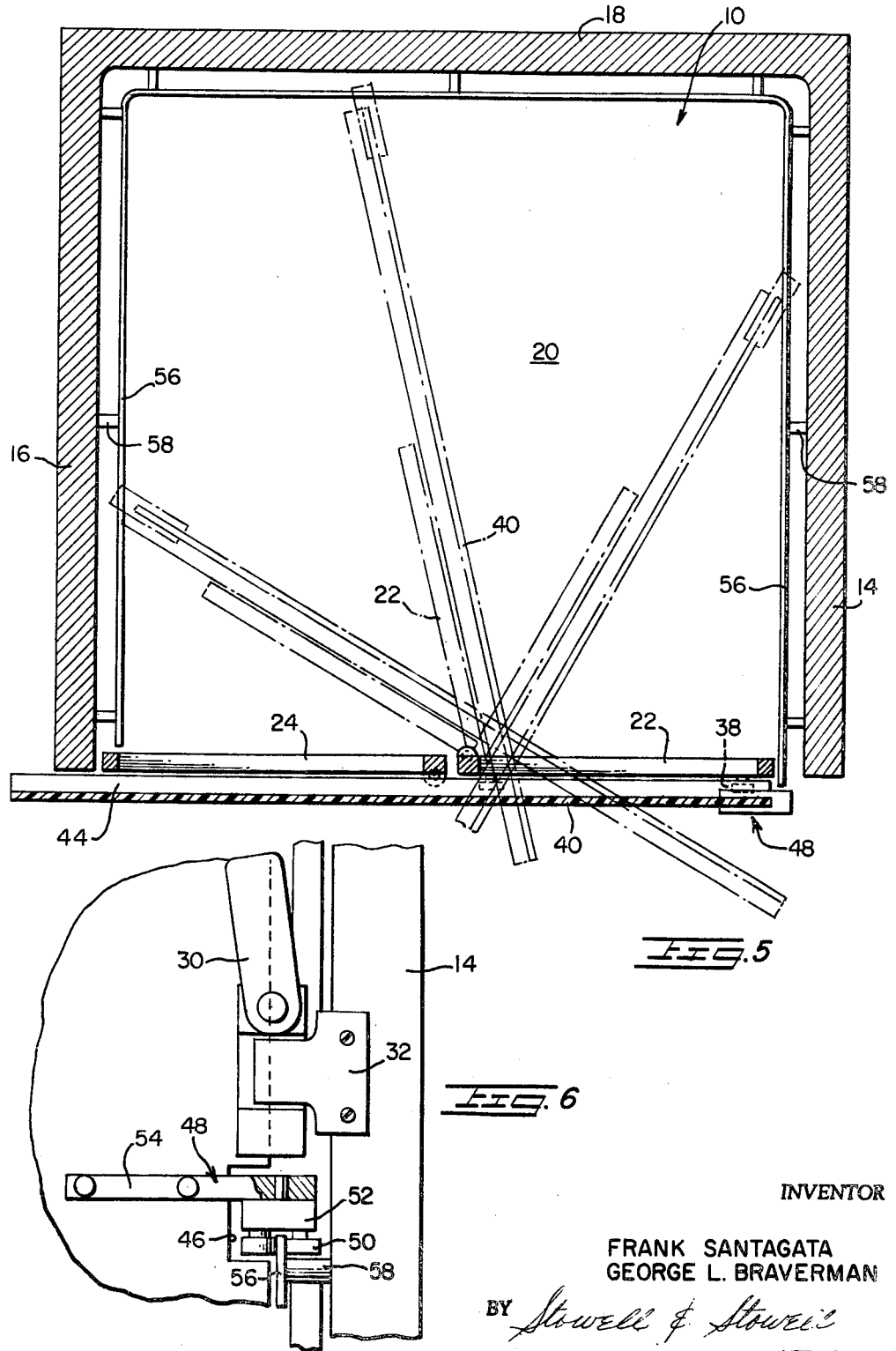

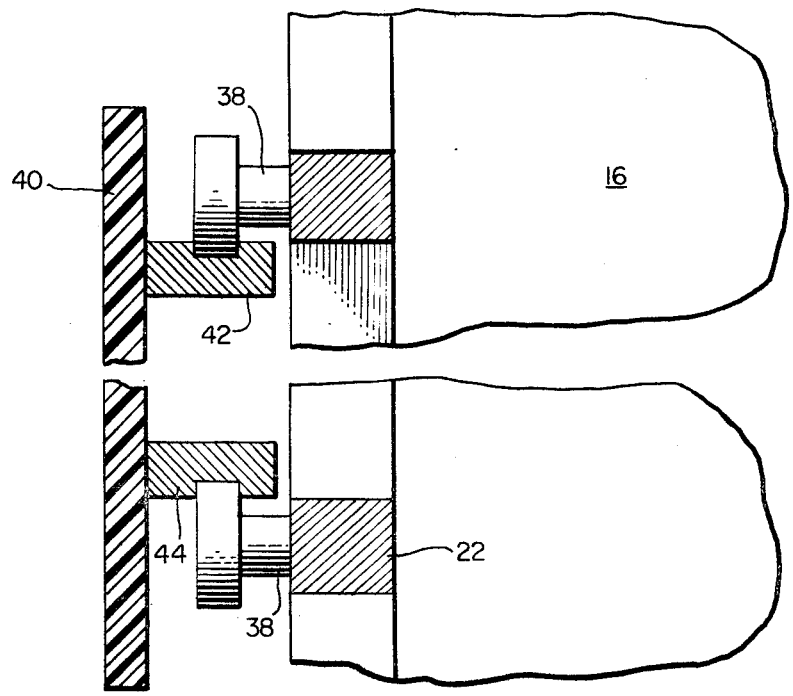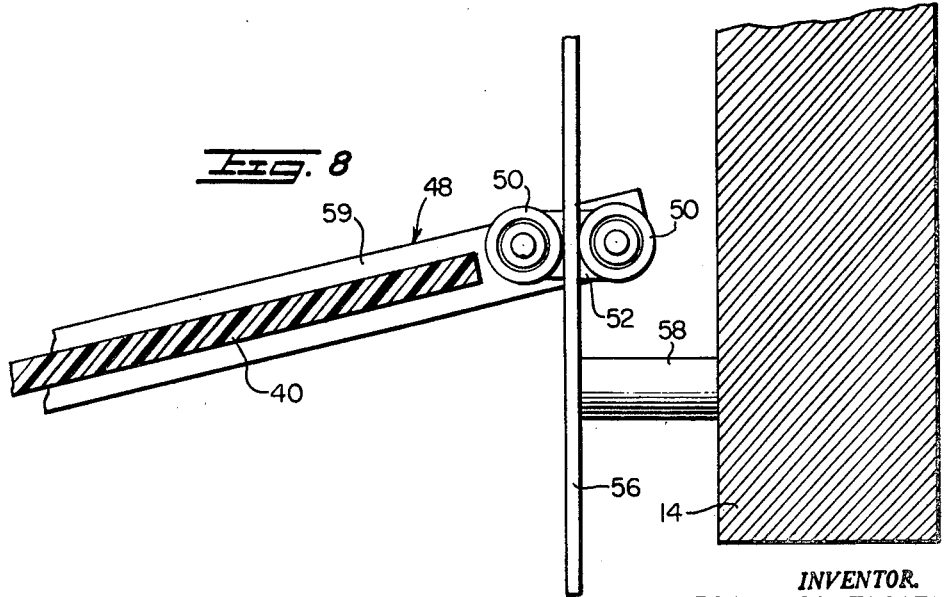

United States Patent Office 3,494,330
Patented Feb. 10, 1970

3,494,330
ANIMAL CAGE
Frank Santagata and George L. Braverman, Long Branch, N.J., assignors to Bio-Science Industries, Inc., Long Branch, N.J., a corporation of New Jersey
Filed Jan. 15, 1968, Ser. No. 697,684
Int. Cl. A01k 31/06, 29/00
U.S. Cl. 119—17                                6 Claims

ABSTRACT OF THE DISCLOSURE

An animal cage having an inwardly pivoting door which slidably receives a panel thereon. A guide is positioned in the cage and engages the panel to maintain one edge thereof in close proximity to the inner periphery of the cage as the door is pivoted inwardly. Pivotal motion of the door causes the panel to sweep the interior of the cage to direct and closely confine an animal occupant against a portion of the cage adjacent the door.

BACKGROUND OF THE INVENTION

This invention relates generally to animal cages and more particularly to an enclosure especially adapted to house primates in biological laboratories.

Although this invention will be specifically described hereinafter as applied to enclosures for housing animals for medical experimentation, it should be understood that the structure described herein is equally applicable to any animal housing situation wherein periodic and frequent access to or control of housed animals is required.

Animals and particularly primates are widely used in modern medical-biological experimentation. Such animals are usually housed in individual cages and frequent access to the caged animals is required for purposes of medication, examination and/or transfer of the animals. Particularly in the case of primates, obtaining such access is generally difficult and dangerous to the handler because of the disposition of the primate. In cage enclosures of the prior art, it has been necessary to open the cage access and manually reach in and capture the animal for inoculation, examination or transfer. In opening the cage, there is a danger of the animal escaping from the enclosure and, since the handler must bodily engage the animal, there is a danger of being bitten or otherwise injured by the animal. The necessity of confining and trapping the animal in one portion of the cage is also time-consuming and, in situations where many such animals must be handled daily in this manner, the difficulty and expense incurred in such activity is considerable.

SUMMARY OF THE INVENTION

This invention provides a means to overcome the disadvantages of the prior art by furnishing an enclosure for housing animals which incorporates structure for confining and directing the housed animal to an accessible portion of the enclosure.

This is accomplished in a preferred embodiment by providing an enclosure having an inwardly pivoting portion thereto; a panel slidably mounted on the pivotal portion to follow the movement thereof; guide means disposed around the inner periphery of the enclosure; and follower means on the panel disposed to engage the guide means and maintain an edge of the panel in proximity to the inner periphery of the enclosure upon pivotal movement of the portion. The panel thereby sweeps the interior of the enclosure and directs the occupant thereof to a position adjacent the pivotal portion. An outwardly pivotal door is provided adjacent the pivotal portion for removal of the animal-occupant.

BRIEF DESCRIPTION OF THE DRAWINGS

The objects and advantages of this invention will become better understood to those skilled in the art by reference to the following detailed description when viewed in light of the accompanying drawings wherein like components throughout the figures thereof are indicated by like numerals and wherein:

FIGURE 1 is a perspective view, partly broken away, of an enclosure in accordance with the invention;

FIGURE 2 is an enlarged fragmentary view of a portion of the enclosure of FIGURE 1;

FIGURE 3 is a front elevational view of the enclosure of FIGURE 1;

FIGURE 4 is an elevational sectional view of the enclosure of FIGURE 2 taken along the lines 4—4 thereof;

FIGURE 5 is an enlarged fragmentary view of a portion of the enclosure as seen in FIGURE 4;

FIGURE 6 is an enlarged fragmentary view of a portion of the enclosure as seen in FIGURE 3;

FIGURE 7 is a plan sectional view of the enclosure of FIGURE 3 taken along the lines 7—7 thereof; and FIGURE 8 is an enlarged fragmentary view of the enclosure of FIGURE 3 as seen in section along the lines 8—8 thereof and illustrating a sequence of operation of the invention.

DESCRIPTION OF THE PREFERRED EMBODIMENT

Referring now to FIGURES 1 and 2 of the drawings, the enclosure, indicated generally at 10, comprises a top wall 12, side walls 14 and 16, a back wall 18 (FIGURE 3) and a bottom wall 20. The front of the enclosure 10 incorporates a pair of barred doors 22 and 24, pivotally mounted in upper and lower brackets 26 and 28 disposed at the center of the top and bottom walls 12 and 20. The door 22 is provided with a latch 30 which engages a keeper or strike 32 on the front face of the side wall 14. With reference more particularly to FIGURE 6 of the drawings, it can be seen that the keeper 32 is disposed to engage the foward face of the door 22 to thereby restrict pivotal movement thereof outward from the enclosure 10. The door 24 is similarly provided with a latch 34 and a keeper 36 which is disposed to permit pivotal movement of the door outwardly of the enclosure 10. Although the latches illustrated are of the swinging bar type, it should be obvious that any latch, such, for example, as a spring loaded reciprocating tongue and slot latch, may be substituted for those illustrated without exceeding the scope of the invention. Locks to prevent accidental release of the latches may also be provided if so desired.

The door 22 is provided with rotatably mounted wheels 38 on the forward face proximate the upper and lower edges thereof. A panel 40, preferably formed of a transparent material such, for example, as Lucite or the like, and of a height less than the height of the interior of enclosure 10, is provided with upper and lower tracks 42 and 44 on the inner surface thereof disposed in such a manner as to engage the wheels 38 and thereby slidably connect the panel to the door 22. Obviously, other means such, for example, as a tongue and groove arrangement or the like may be substituted for the wheel and track arrangement illustrated without exceeding the scope of the invention. In the latter case, the material making up the tongue and groove structure may comprise a composition having a low coefficient of friction, such, for example, as nylon, polytetrafluoroethylene or the like. The panel 40 is provided, proximate one edge thereof, with a cut out portion 46 receiving a guide follower 48. The guide follower 48 comprises a pair of wheels 50 mounted on a carrier 52 which, in turn, is pivotally connected to a mount 54 disposed on the panel 40.

Referring now more particularly to FIGURES 3, 4 and 5, the enclosure 10 has, formed around the inner surfaces of the walls 14, 16 and 18, a guide 56 mounted thereto on spacers 58. The guide 56 comprises an elongated strip of suitable thickness to closely fit between the wheels 50 of the guide follower 48 as can be better seen by reference to FIGURE 8.

As can be seen in FIGURES 3, 4 and 5, the panel 40 is positioned with the tracks 42 and 44 initially engaging the first set of wheels 38 on the door 22.

In FIGURES 6 and 7, the panel 40 is illustrated fully positioned over the doors 22 and 24 with the tracks 42 and 44 fully engaging the wheels 38. As is best seen in FIGURE 6, with the panel 40 in the fully engaged position, the wheels 50 on the guide follower 48 transversely are aligned with the guide 56. The details of the guide follower are omitted from the illustration of FIGURE 7 for purposes of clarity, and successive positions of the door 22 and panel 40 are illustrated in phantom view.

In operation, with the enclosure 10 in the configuration shown in FIGURE 1, the panel 40 is aligned parallel to the front of the enclosure and is fitted onto the wheels 38 as seen in FIGURE 3. The latch 30 is raised as seen in FIGURE 3 and the panel is moved to the position shown in FIGURES 6 and 7. The door 22 is then pivoted inwardly by pushing and/or an outward pull on the left-hand side of the panel 40 in the stages shown in phantom line in that figure. Simultaneously, the panel 40 pivots with the door and follows, due to the interaction between the guide follower 48 and the guide 56, the contour of the interior of the enclosure 10. With this motion, substantially the entire interior of the enclosure 10 is swept by the panel 40 and an animal positioned at any point in the interior is pushed or directed toward the front left-hand side of the enclosure. As the door 22 approaches the full inward pivotal position, the animal is trapped between that door and the door 24 and may be held substantially immobilized in this position by continued pressure against the outer end of the panel 40. At this point, the door 24 may be opened if it is desired to remove the animal immediately, or the animal may be injected through the bars of the door 24 with a tranquillizing drug or the like in order to facilitate further handling. Such removal is accomplished by merely raising the latch 34 and opening the door 24. If it is desired to inoculate or otherwise treat the animal or perform a quick examination, such may be accomplished through the door 24 without having to manually handle the animal. If, for any reason, the force on the panel 40 is released or the animal overcomes the handler by forcing the door 22 toward the position of FIGURE 1, there is no danger of escape of the animal since such action will return the enclosure to its initial configuration, as shown in FIGURE 1.

By fabricating the panel 40 of a transparent material, it is possible to observe the behavior and condition of the animal during the operation of the door.

Although the panel 40 is illustrated as being substantially equal in length to the width of the enclosure 10, the panel may be fabricated of any length suitable to give the proper leverage in actuating the door 22. Extension handles or the like may also be attached to the panel 40 to increase the leverage available if so desired.

Although the enclosure 10 is illustrated as square in plan form shape, it should be obvious that the cage may take any suitable shape such, for example, as rectangular, semi-circular or the like.

The wheel configuration of the guide follower, although preferable for this embodiment, may be replaced with other structure such, for example, as slide followers, tongue and groove followers or the like. In these latter instances, the follower and/or the guide 56 may be formed of a material having a low coefficient of friction such, for example, as nylon, polytetrafluoroethylene or the like. The guide 56 may also assume other configurations, such, for example, as a cam slot for receiving a tongue from the follower 48 or other convenient configuration.

What has been set forth above is intended primarily as exemplary of a teaching of the invention to enable those skilled in the art in the practice thereof. It should therefore be understood that the invention may be practiced other than as specifically described.

What is claimed is:
1. A device for housing animals comprising:
walls forming an enclosure;
one of said walls having an inwardly pivotal portion thereto;
a panel slidably connected to said pivotal portion to follow the movement thereof;
guide means disposed around the inner periphery of said enclosure;
follower means mounted on said panel and disposed to engage said guide means and maintain an edge of said panel in proximity to the walls of said enclosure upon movement of said pivotal portion.

2. A device in accordance with claim 1 wherein openings are formed in the wall of said enclosure next adjacent the pivotal axis of said pivotal portion whereby access may be obtained to that portion of the enclosure.

3. A device in accordance with claim 1 wherein said one wall is provided with an outwardly pivotal portion adjacent the pivotal axis of said inwardly pivotal portion.

4. A device in accordance with claim 4 wherein the pivotal axes of said pivotal portions are parallel and adjacent one another.

5. A device in accordance with claim 4 wherein said pivotal axes are vertically disposed centrally of said one wall.

6. A device in accordance with claim 1 wherein at least a portion of said panel is transparent.

References Cited

UNITED STATES PATENTS

| | | | |
|---|---|---|---|
| 459,216 | 9/1891 | Sumner | 119—17 |
| 3,399,654 | 9/1968 | Schroer | 119—17 X |

HUGH R. CHAMBLEE, Primary Examiner

U.S. Cl. X.R.

119—96